C. PEARCE.
COFFEE POT.
APPLICATION FILED MAR. 4, 1910.
971,781.
Patented Oct. 4, 1910.
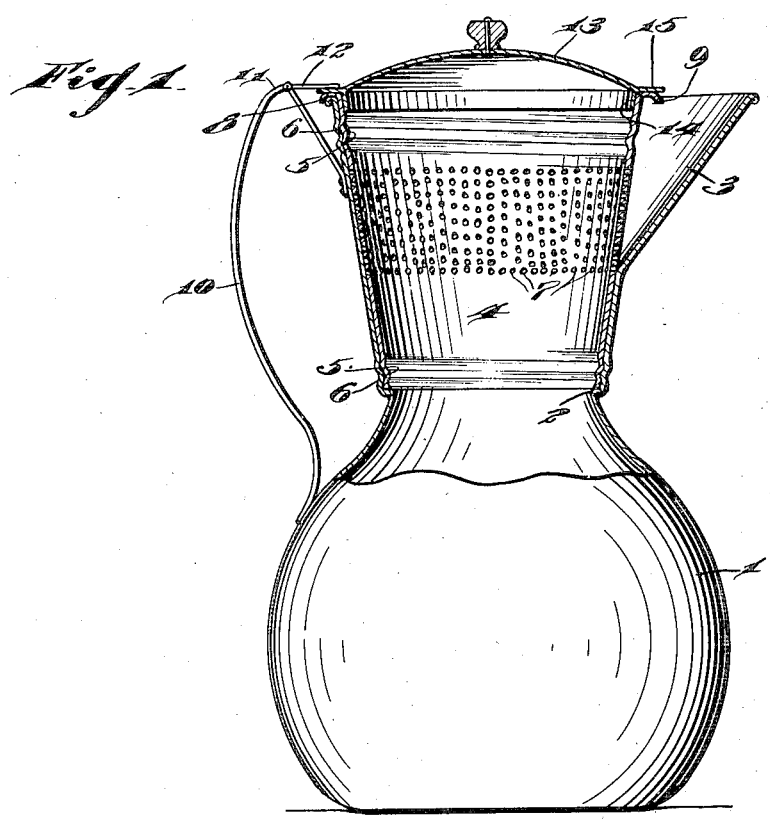
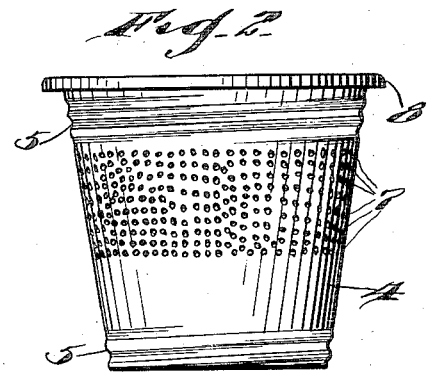
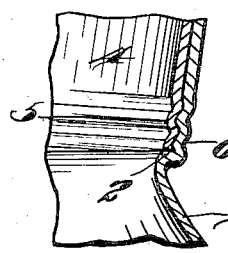
Witnesses
Theo. Rosemann
R. H. Krenkel
Inventor
Clara Pearce,
By Joshua R. H. Potts,
Attorney

UNITED STATES PATENT OFFICE.

CLARA PEARCE, OF PHILADELPHIA, PENNSYLVANIA.

COFFEE-POT.

971,781.

Specification of Letters Patent.

Patented Oct. 4, 1910.

Application filed March 4, 1910. Serial No. 547,184.

*To all whom it may concern:*

Be it known that I, CLARA PEARCE, a citizen of the United States, residing at Philadelphia, in the county of Philadelphia and State of Pennsylvania, have invented certain new and useful Improvements in Coffee-Pots, of which the following is a specification.

My invention relates to improvements in coffee pots, the object of the invention being to provide a coffee pot in which the body of the pot and the spout are integral, and I provide a conical strainer which is removably held within the coffee pot and fits within the pot, and is provided with an annular series of perforations, some of which register with the spout so as to strain the coffee when poured out, and which strainer may be readily removed and the entire coffee pot and the strainer may be thoroughly cleaned and the device rendered absolutely sanitary.

Heretofore coffee pots have usually been made with a fixed strainer at a point of juncture of the spout with the coffee pot, and the coffee grounds accumulate in the lower end of the spout against the fixed strainer, and it is difficult, if not quite impossible to clean the spout at this point. With my improvements the strainer is removable, yet when in position is securely held so that it operates as a fixed strainer, yet it can be easily removed and the coffee pot and strainer thoroughly cleaned.

With these and other objects in view, the invention consists in certain novel features of construction and combinations and arrangements of parts, as will be more fully hereinafter described and pointed out in the claims.

In the accompanying drawings: Figure 1 is a view partly in vertical section and partly in elevation illustrating my improvements. Fig. 2 is a view in elevation of the strainer removed, and Fig. 3 is an enlarged view in vertical section illustrating the juncture of the lower end of the strainer with the body of the coffee pot.

1 represents the body of my improved coffee pot, the upper portion of which is circular in cross section and tapering vertically, being largest at its upper end and smaller at its lower end, which lower end is located about midway the length of the body of the pot, and at this point the body is made with an internal annular shoulder 2 for a purpose which will hereinafter appear.

3 represents the spout which is integral with the body portion 1 and has open communication therewith.

4 represents my improved strainer which is of tapering or conical form, circular in cross section and of an external diameter to snugly fit the internal diameter of the upper portion of the body 1, and of a length sufficient to extend through the tapering upper portion of the body. This strainer 4 is provided at its lower end and near its upper end with screw threads 5 which engage screw threads 6 in body 1, these screw threads being preferably formed by so shaping the metal of the body and the strainer, yet enabling a snug juncture and permitting the strainer to be screwed down tight on the internal annular shoulder 2, so as to positively exclude any coffee from between the strainer and the body of the pot. This strainer is provided with an annular series of perforations 7, which are in a line to register with the spout 3, and when in position some of these perforations do register with the spout and serve to strain the coffee being poured out. By reason of the annular series of perforations, the strainer may be turned so as to present different sets of perforations to the spout and thereby increase the life of the strainer. The upper end of the strainer is provided with an annular curved flange 8, which is adapted to engage over the upper end of the coffee pot, the spout 3 being cut away or notched as shown at 9 to accommodate this flange.

10 represents the handle of the coffee pot which is secured at its lower end to the lower enlarged portion of the body, and at its upper end to the upper portion of the body and is bent so as to extend at its highest point slightly above the upper end of the coffee point as shown at 11. An arm 12 is hinged to this highest point of the handle 10 and is secured to a cover 13, which latter is provided with a depending annular flange 14 adapted to fit within the strainer 4 and with an outwardly projecting flange 15 adapted to overlie the flanged portion 8 of the strainer.

When it is desired to remove the strainer, it is simply necessary to raise the cover 13 and throw it back on its hinge, when by grasping the flanged upper end 8 of the strainer, the latter can be turned so as to unscrew it from engagement with the body and permit its ready removal. When the parts are thoroughly cleaned, the strainer can be inserted and when turned in the opposite direction its screw threads will engage with the screw threads of the body and firmly secure the strainer in position with its lower end bearing tightly against shoulder 2.

Various slight changes might be made in the general form and arrangement of parts described without departing from my invention, and hence I do not restrict myself to the precise details set forth, but consider myself at liberty to make such changes and alterations as fairly fall within the spirit and scope of the appended claims.

Having thus described my invention, what I claim as new and desire to secure by Letters Patent is:—

1. A coffee pot, comprising a body having an upper conical or tapering portion and a spout communicating with said conical portion of the body, said body having screw threads at the upper and lower ends of its conical portion, a conical strainer having screw threads at its upper and lower end constructed to engage the screw threads in the body, a flange at the upper larger end of the strainer overlapping the upper end of the body, said strainer having an annular series of perforations, any of which may be positioned in register with the spout, substantially as described.

2. A coffee pot, comprising a body having an upper conical portion, a spout communicating with the conical portion, a conical strainer adapted to fit within the conical portion of the body, screw threads at the upper and lower ends of said strainer, screw threads in the body to engage with the screw threads of the strainer, an internal annular shoulder in the body against which the lower end of the strainer bears, and an annular flange at the upper end of the strainer overlapping the upper end of the body.

3. A coffee pot, comprising a body having an upper conical portion, a spout communicating with the conical portion, a conical strainer adapted to fit within the conical portion of the body, screw threads at the upper and lower ends of said strainer, screw threads in the body to engage with the screw threads of the strainer, an internal annular shoulder in the body against which the lower end of the strainer bears, an annular flange at the upper end of the strainer overlapping the upper end of the body, a handle secured to said body, a cover having a downwardly projecting flange to fit within the strainer, an outwardly projecting flange on the cover to overlie the flange of the strainer, and an arm secured to the cover and hinged to said handle.

In testimony whereof I have signed my name to this specification in the presence of two subscribing witnesses.

CLARA PEARCE.

Witnesses:
 BEATRICE HERMAN,
 R. H. KRENKEL.